(12) United States Patent
Dresin et al.

(10) Patent No.: US 6,451,885 B1
(45) Date of Patent: Sep. 17, 2002

(54) BITUMEN EMULSIONS, METHOD FOR OBTAINING THEM AND COMPOSITIONS CONTAINING SAME

(75) Inventors: Jean-Marc Dresin, Chomerac; Nadège Picard, Lyons; Brice Siaud, Heyrieux; Claude Stock, Soleymieu, all of (FR)

(73) Assignee: Lafarge, Paris (FR)

( * ) Notice: Subject to any disclaimer, the term of this patent is extended or adjusted under 35 U.S.C. 154(b) by 0 days.

(21) Appl. No.: 09/743,882

(22) PCT Filed: Jul. 8, 1999

(86) PCT No.: PCT/FR99/01669

§ 371 (c)(1), (2), (4) Date: May 7, 2001

(87) PCT Pub. No.: WO00/04096

PCT Pub. Date: Jan. 27, 2000

(30) Foreign Application Priority Data

Jul. 16, 1998 (FR) .............................................. 98 09242

(51) Int. Cl.$^7$ .............................................. C08L 95/00
(52) U.S. Cl. ........................... 524/60; 524/59; 106/277; 106/668; 106/670
(58) Field of Search ................................ 106/277, 668, 106/670; 524/4, 60, 61, 59

(56) References Cited

U.S. PATENT DOCUMENTS

| 3,432,320 A | 3/1969 | Pitchford et al. ........... 106/277 |
| 4,084,981 A | 4/1978 | Higuchi et al. ................ 106/96 |
| 5,156,652 A | 10/1992 | Gregoli et al. ................ 44/302 |

FOREIGN PATENT DOCUMENTS

FR    2 076 630    10/1971

*Primary Examiner*—Peter Szekely
(74) *Attorney, Agent, or Firm*—Kenyon & Kenyon

(57) ABSTRACT

The invention concerns an aqueous bitumen emulsion, consisting of the following constituents expressed in weight percentages of the emulsion total weight: 50% to 70% of bitumen; 0.5% to 10% of surfactant; 0% to 5% of thickening agent; 0% to 1% of antifoaming agent; a sufficient quantity of water to make up 100%. Said emulsion is characterised in that the surfactant consists of at least a surfactant selected among the group consisting of an ethylene oxide and a propylene oxide copolymer, with PO/EO ratio ranging between 1.5 and 10, an ethoxylated and/or propoxylated epoxidized surfactant, and a polyvinyl alcohol having molecular mass ranging between 10000 and 150000. The invention also concerns the method for obtaining said emulsions, the compositions containing them, and the use of said bitumen emulsions for the formulation of compositions comprising a hydraulic or organic binder, and/or a mineral or organic filler.

43 Claims, 5 Drawing Sheets

DP: Start of setting    FP: End of setting

-DP Portland ---DP high-alumina ---FP Portland —FP high alumina

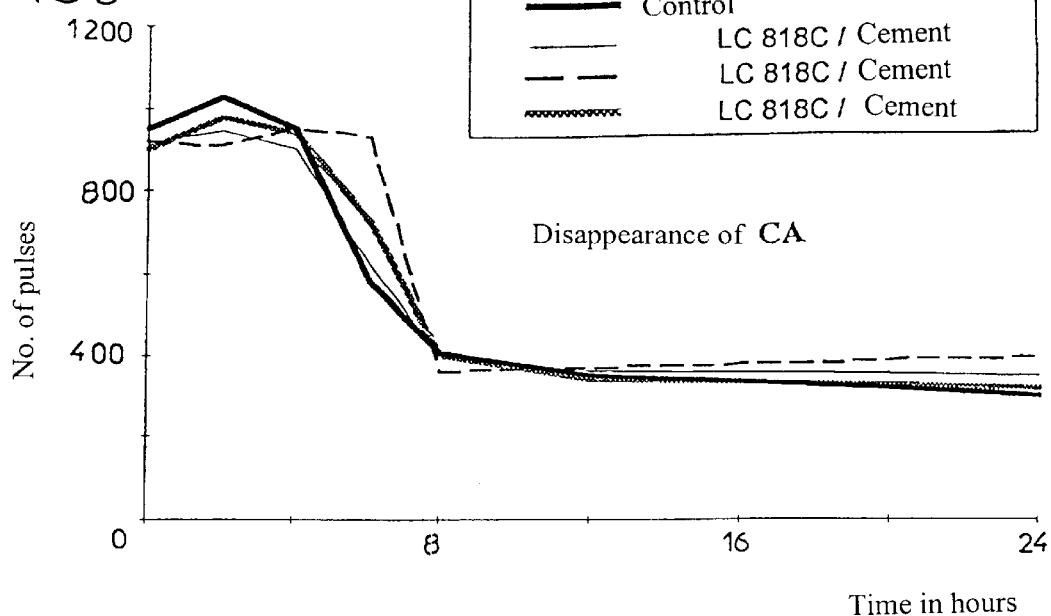
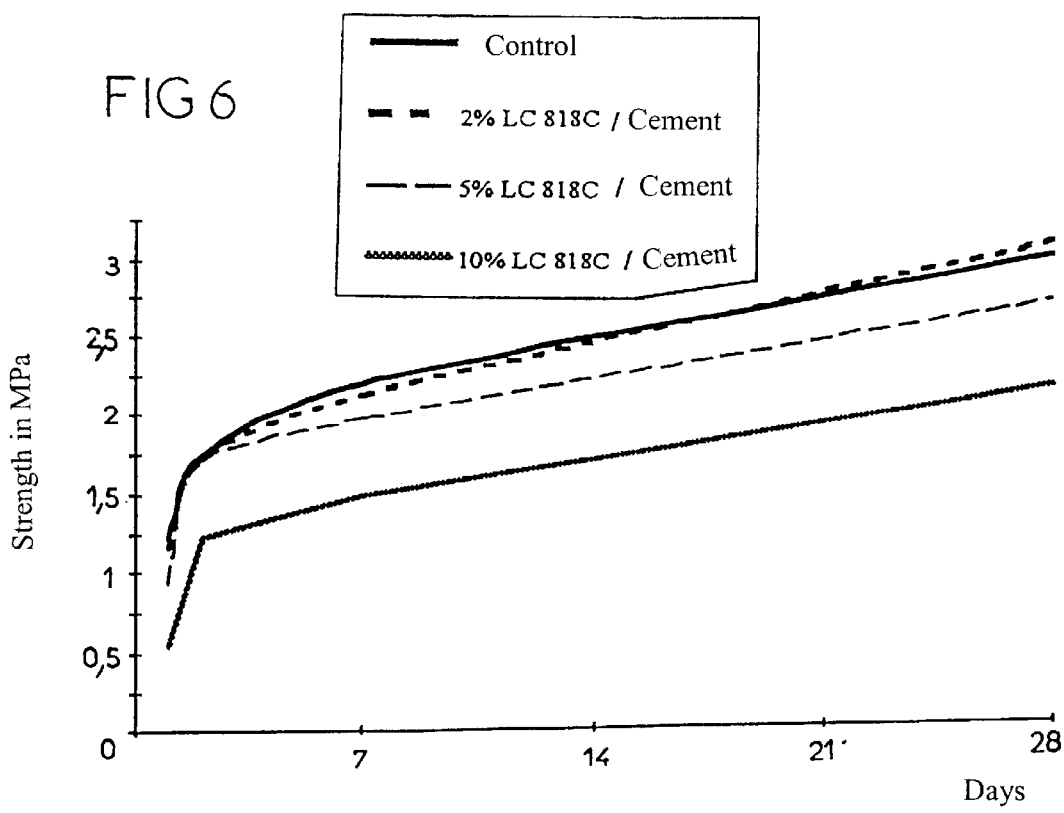

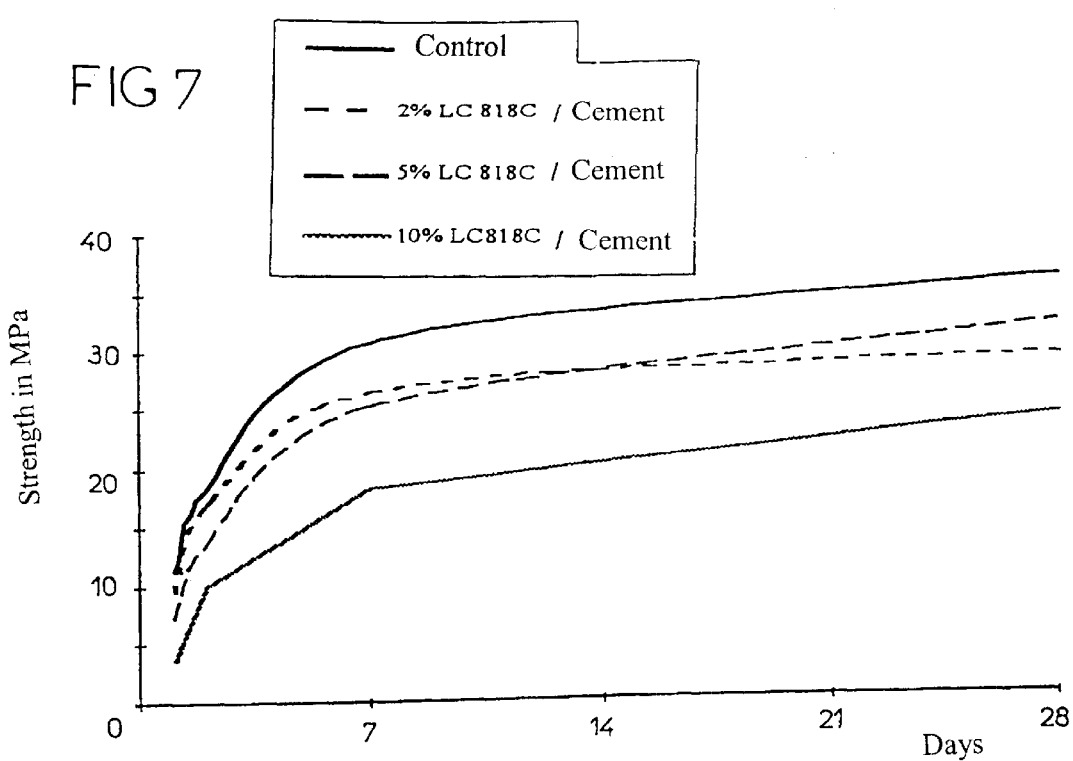
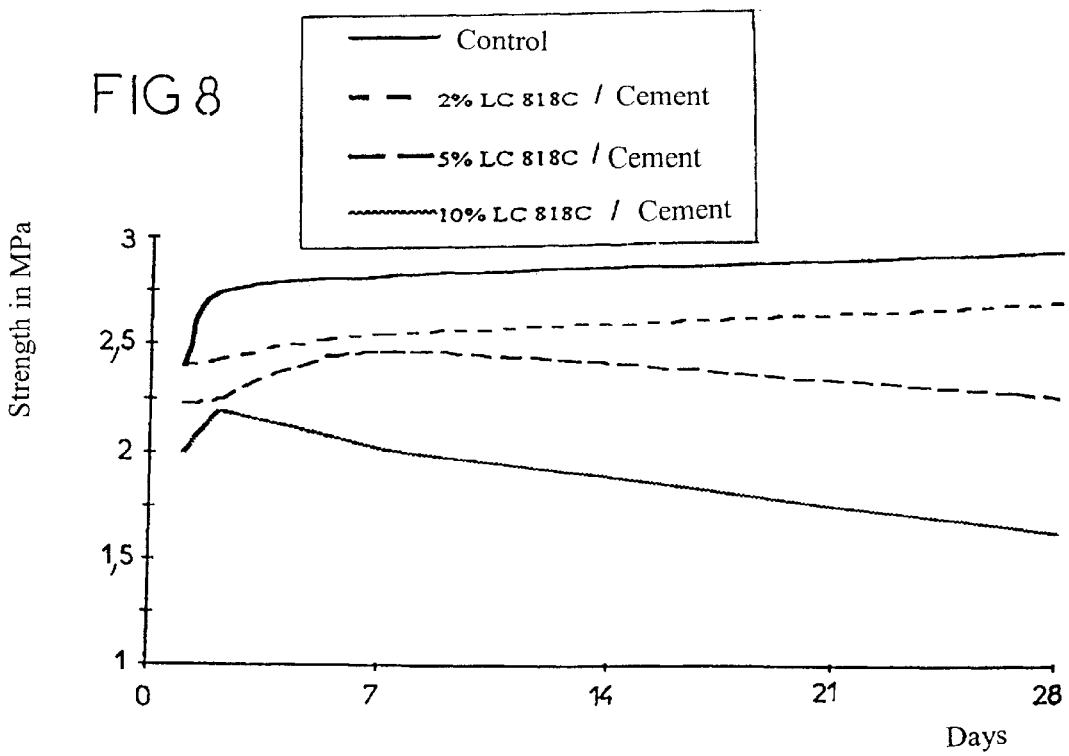

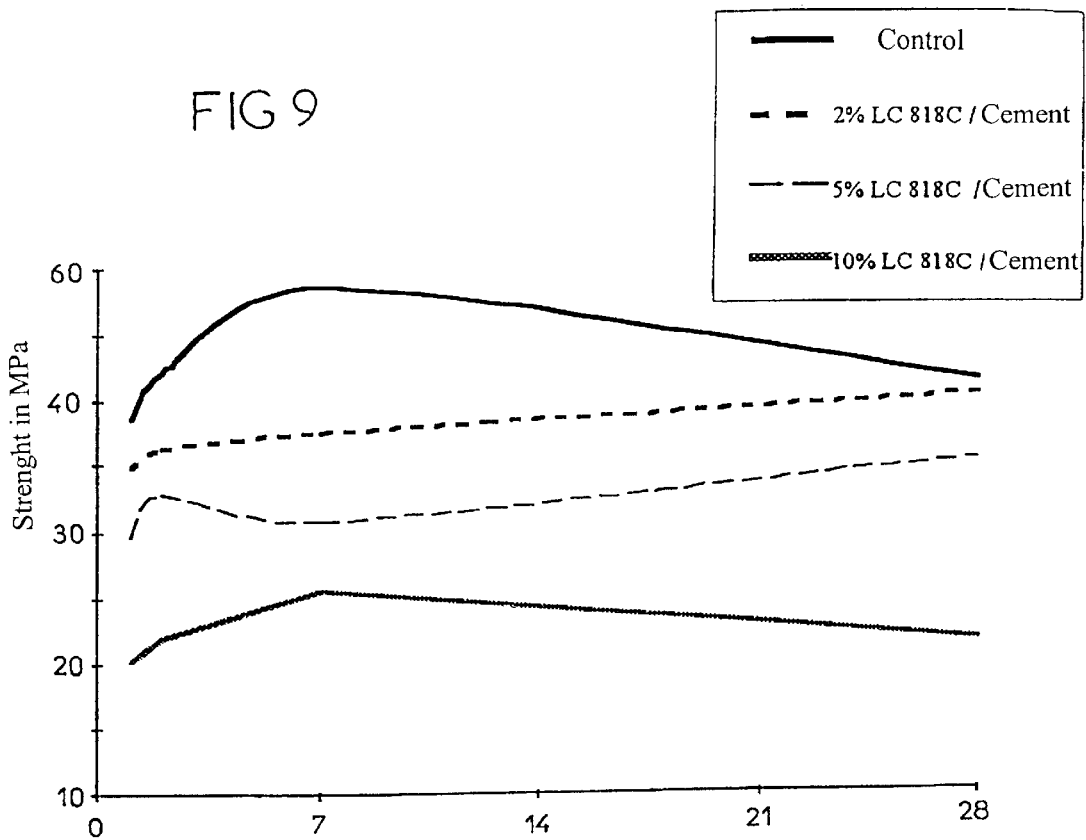

BITUMEN EMULSIONS, METHOD FOR OBTAINING THEM AND COMPOSITIONS CONTAINING SAME

The present invention relates to stabilised bitumen emulsions and their incorporation into composite compositions comprising either hydraulic or organic binders, or inorganic fillers, or a mixture of these components. The present invention relates more particularly to surfactant-stabilised aqueous emulsions of bitumen, and compositions formulated from such emulsions and designed to be incorporated at the time of use into the above components, for use in the building industry or civil engineering, and notably mortar-adhesive compositions, seams for roads and highways, paints, mortars for flooring, coatings and concretes.

The formulation of mortar-adhesive type products, coatings for outer facings, paints, coatings for finishing floors, etc comprises a basic binder, generally hydraulic or organic, to which the various additives, or even other binders, are added, to improve, among other things, rheological properties (facilitating implementation), mechanical characteristics, and drying characteristics. Frequently, when hydraulic binders are used for example, polymers are incorporated for improving mechanical strength characteristics, flexibility, and ability to withstand deformation. In the case of hydraulic binders, this polymer is generally in the form of a polymer in emulsion or in dispersion (latex, for example). This additive represents a non-negligible supplementary cost in such formulations, which it is desirable to reduce.

The question of using bitumen in emulsion, known to be inexpensive, has frequently been posed, but great difficulties in achieving formulations in the fields of application applicant is aiming at were encountered, as:
- a bitumen emulsion that is stable over a long period must be provided, notably stable for more than six months, before mixing it with products which are frequently in powder form, whether or not pre-formulated, in the dry state, meaning that the complete product should be able to be stored in the form of a kit of components;
- the hydraulic binders or inorganic fillers of the formulation flocculate or cause the emulsion to flocculate during mixing therewith;
- the formulations to be provided do not achieve the desired characteristics or the formulations are too complex or expensive to be employed in practice.

The applicant has consequently set out to obtain bitumen emulsions which can meet these objectives, having universal suitability for incorporation, without breaking the emulsion, into formulations, for example for construction, which are easy to implement, in other words, notably, not presenting problems of delaying or accelerating setting.

Bitumens are mixtures of heavy hydrocarbons, essentially naphthenic and paraffinic, originating from the distillation of crude oils. These products are distillation residues and are classified by their physical properties, their chemical properties varying very widely as a function of the origins of the crude. Generally speaking, conventional crudes contain up to 30% bitumen, and heavy crudes up to 50%. As bitumen requirements of the majority of countries represent 2 to 4% of their crude oil consumption, this means that bitumen is available in very plentiful supply. Bitumens contain such a diversity of constituents that it is impossible to define their exact composition; nevertheless, it is possible to classify these constituents into major chemical families:
- saturated compounds, essentially paraffinic;
- aromatic compounds, in which 30% of the carbon atoms are included in aromatic cycles, with a sulphur content of around 2 to 3%;
- asphaltenes, which are insoluble in hydrocarbons, are aromatic and rich in sulphur, nitrogen, and oxygen; they take the form of black brittle solids practically incapable of being melted.

For given bitumens, the percentage of these various families depends heavily on the extraction method used. Thus, products of this type are essentially classified by the following physical properties: penetrability (NFT 66-004), softening point (NFT 66-008), density (NFT 66-007), flashpoint (NFT 60-118), solubility (NFT 66-012) ductility (NFT 66-006), brittleness point. Commercially available bitumens, classified by penetrability index, are generally situated between 10 and 200. Currently, only two grades are able to remain emulsified at atmospheric pressure, the 80/100s and 180/220s, but it is possible, in certain cases, to emulsify 40/50 grade.

Like all materials, bitumen is sensitive to fatigue, and consequently its breaking strength can fall when subject to repeated stresses. As against this, it has a self-repairing capability allowing the destructive effects of fatigue phenomena to be limited. It is known to improve the flexibility properties of some bitumens by mixing them with synthetic elastomers such as styrene-butadiene polymers or atactic polypropylene.

Bitumen emulsions were developed for making cold coating compounds, some 60 years ago, and numerous articles and patents disclose bitumen emulsions manufacture by associating several surfactants of different natures. The three main types of emulsion are:
- cationic emulsions, in which the surfactants are constituted by polar molecules of formula $RNH_3^+$ $X^-$, R being the hydrocarbon chain constituting the lipophilic portion of the molecule, and $NH_3^+$ $X^-$ the hydrophilic portion, $X^-$ being any anion whatsoever of a strong acid.
- anionic emulsions of general formula R—Y— $C^+$, R being the hydrocarbon chain constituting the lipophilic portion, and $Y^-$ $C^+$ being the hydrophilic portion, $Y^-$ being a carboxylic, sulphonic, sulphuric, phosphonic or phosphoric group, $C^+$ being a metal cation, frequently alkaline, or ammonium;
- non-ionic emulsions, in which the surfactants are constituted by molecules of the $R—(EO)_n—OH$ type, in which R is the hydrocarbon chain constituting the lipophilic portion of the molecule, the hydrophilic portion being constituted by the $—(EO)_n—OH$ radical (EO signifying ethylene oxide). The most frequently encountered bitumen emulsions are however cationic or anionic emulsions.

The surfactants employed for obtaining these emulsions are chosen so as to stabilise the emulsion during the period of storage, which frequently is not very long, for example only a few weeks, in the case of emulsions for roads and highways for carrying out cold coating. Moreover, it is frequently necessary to add components other than surfactants such as thickeners, to improve their stability.

Generally speaking, bitumen emulsions are made hot, by mixing, continuously or discontinuously, the two pre-heated phases (water at 50° C., bitumen from 140° C. to 170° C.) using a disperser, the emulsifying surfactant being able to be introduced previously into either the aqueous or bitumen phase. Examples of known emulsions obtained in this way are given below in table 1:

TABLE 1

| Anionic emulsion | cationic emulsion |
|---|---|
| 80/100 bitumen: 55% | 180/220 bitumen: 65% |
| Sodium dodecylbenzene sulfonate: 3% | propylene diamine of tallow (Dinoram S): 2 g/l |
| | hydrochloric acid up to pH = 2.0 to 2.5 |
| | gelling agent (Nopco DSX 1550): 1.75 g/l |
| Water: 42% | water: 35% |

The bitumen emulsions thus obtained are used in many different ways. For example, in the road making field, it is known to "provoke breakage" of the bitumen emulsion by introducing a small amount of a cement into it the sole effect of which is to cause the medium to flocculate and improve departure of water. These emulsions are, in effect, formulated so as to provoke their destabilisation in the presence of inorganic granulates or powers (e.g. silica, chalk, cement). The most common applications of these types of emulsions are bituminous beds or base courses, cold surfacing materials, bituminous slurries, and keying and waterproofing layers. Applications other than road making are essentially those of sealing compounds for dams and canals in civil engineering as well as roof and foundation waterproofing in the building industry.

Cationic surfactants, (like amphoteric surfactants) cannot be used where it is desired to mix the bitumen emulsions and a hydraulic binder, such as a cement, which is basic by nature, as, inevitably, the emulsion is broken in this case. Thus, the oxyethylated fatty amines, alkylimidazolines, and the alkyl betains, are for example surfactants that cannot be used for providing the emulsions according to the present invention.

The anionic surfactants, comprising carboxylates, sulfates, sulfonates, phosphates and phosphonates, are not suitable for producing bitumen emulsions intended to be mixed with a hydraulic binder. In particular, the phosphates and phosphonates lead to hydration modifications of the hydraulic binder and significant set retardation.

Known non-anionic surfactants employed in these emulsions offer a wide diversity of forms and chemical natures: one for example can distinguish fatty alcohols, alkylphenols, various vegetable oils, whether or not ethoxylated, and condensates of ethylene and propylene oxides.

Non-ionic bitumen emulsions are disclosed in French patent 2,246,509 and U.S. Pat. No. 5,156,652. U.S. Pat. No. 5,156,652 discloses a possible combination of non-ionic surfactants for stabilising a bitumen emulsion designed to be transported over great distances via pipelines. The surfactants disclosed are essentially ethoxylated alkylphenol, but the latter can be used in combination with an ethoxylated and propoxylated alcohol block copolymer, of the following formula:

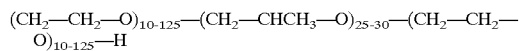

$(CH_2-CH_2-O)_{10\text{-}125}-(CH_2-CHCH_3-O)_{25\text{-}30}-(CH_2-CH_2-O)_{10\text{-}125}-H$ French Patent Application 2,246,509 discloses the use of non-ionic surfactants for stabilising asphalt emulsions, the surfactants being able to be ethoxylated alkylphenols in combination with polyethylene alkylethers of the following formula:

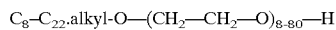

$C_8-C_{22}\text{-alkyl-O}-(CH_2-CH_2-O)_{8\text{-}80}-H$

Contrary to the prior art documents, this invention sets out to provide an aqueous bitumen emulsion, with a high bitumen concentration (50 to 70%), which is not only stable over a storage time which can exceed six months, but which can be incorporated into various formulations, for example comprising one or several inorganic or organic binders, and/or one or several inorganic or organic fillers, without causing flocculation, or breaking the emulsion, when the various constituents are being mixed, and without modifying setting or rheology of the mixture. The emulsions according to the invention are characterised by the fact that they have very great stability, thus facilitating their storage over several months, and during mixing with the other constituents of the formulation, for example with a hydraulic binder, the formulation remaining homogeneous and ready and quick to use, which gives the emulsions according to the invention a practically universal character, in terms of possible applications.

The bitumen emulsion thus constituted then provides mixtures into which it is incorporated with particular properties such as, for example, adhesion, flexibility, sealing properties, these properties having previously been obtained using polymers in dispersion or in the re-dispersible powder form.

The invention consequently provides an aqueous bitumen emulsion constituted by the following components, expressed as a percentage of total emulsion weight 50% to 70% bitumen;

0.5% to 10% surfactant;

from 0 to 5% thickener;

from 0 to 1% anti-foaming agent;

water to make up to 100% the emulsion being characterised in that the surfactant is constituted by at least one surfactant selected from the group consisting of a copolymer of ethylene oxide and propylene oxide, of PO/EO ratio comprised between 1.5 and 10, an epoxydated, ethoxylated and/or propoxylated surfactant, and a polyvinyl alcohol of molecular weight comprised between 10,000 and 150,000.

In the description and claims of this invention, the term "PO/EO ratio" means the molar ratio of the PO/EO groups, i.e. the number of PO (propylene oxide) groups to the number of EO (ethylene oxide) groups.

Preferably, the molecular weight of the copolymer of ethylene oxide and propylene oxide is comprised between 1000 and 2200, and it is preferably 2000. For comparison, the molecular weight of the block copolymer disclosed in U.S. Pat. No. 5,156,652 is comprised between 2350 and 12,750.

The copolymers employed as a surfactant in bitumen emulsions according to the invention, and as defined previously, do not lead to foam formation during preparation of the emulsion, thereby facilitating preparation of the latter. Also, when emulsions containing these copolymers are used for preparing compositions containing a hydraulic binder, they cause neither retardation nor acceleration of setting of said binder.

Preferably, and in order to augment the effectiveness of the copolymer defined above, the emulsion can include a supplementary surfactant playing the role of a hydrotrope. Advantageously, the supplementary surfactant is selected from the group consisting of the following non-ionic surfactants:

polyethoxylated alkylphenols of HLB value comprised between 13 and 17, and in particular selected in the group consisting of nonyl phenols 10 EO to 20 EO and tributylphenol 11 EO to 30 EO;

polyethoxylated fatty alcohols of HLB value comprised between 12 and 15, for example, isotridecanol 8 EO, decanol 8 EO, tridecanol 10 EO, and dodecanol 7 EO.

Unexpectedly, applicant has discovered that the polyethoxylated alkylphenols of HLB value comprised between 13 and 17 give the best results. Consequently, and preferably, the supplementary surfactant is a polyethoxylated alkylphenol of HLB value comprised between 13 and 17.

The HLB (hydrophilic-lipophilic balance) can be calculated using Griffin's formula below:

HLB=20×m EO/m T in which EO represents the total ethylene oxide weight and m T the total weight of the molecule.

All the non-ionic surfactants mentioned previously additionally have the advantage of only slightly influencing the hydration characteristics of cements, when emulsions containing these surfactants are employed for formulating this type of composition.

In one preferred embodiment, the surfactant of the bituminous emulsion is a mixture of a copolymer constituted by an ethylene oxide and propylene oxide copolymer of PO/EO ratio comprised between 1.5 and 10 and having a molecular weight of 2000, and of a nonylphenol 10 EO to 20 EO.

In this case, and preferably, the percentages of the surfactant constituted by the ethylene oxide and propylene oxide copolymer, as previously defined, mixed with nonylphenol 10 EO to 20 EO, are from 0.7% to 5% and from 0.1% to 1% respectively. Indeed this binary mixture of two non-ionic surfactants has proved to be the most effective for achieving stable bitumen emulsions, designed for mixing with hydraulic binders.

Despite the low surfactant concentration needed to obtain stability of the emulsion (around 0.5% by weight), it has proved to be important to use higher concentrations in mortar compositions, in order to avoid them flocculating. Indeed, when emulsions according to the invention are employed in mortar compositions, it is preferred to use at least 3% copolymer in the emulsion, with a copolymer/supplementary non-ionic surfactant ratio comprised between 5 and 7.

The invention further provides a method for producing an aqueous emulsion of bitumen as previously defined, characterized in that it comprises the steps consisting of:

preparing an aqueous phase, preferably using a thickener incorporated into water with stirring;

adding to said aqueous phase, a surfactant constituted by at least one surfactant chosen from the group consisting of an ethylene oxide and propylene oxide copolymer in a PO/EO ratio comprised between 1.5 and 10, an epoxydated ethoxylated and/or propoxylated surfactant, and a polyvinyl alcohol of molecular weight comprised between 10,000 and 150,000;

heating the aqueous phase to about 60° C.;

incorporating the bitumen, previously heated between 140° C. and 180° C., into the aqueous phase under powerful mechanical stirring.

An anti-foaming agent can be employed before, during or after incorporating the bitumen phase if foaming occurs.

The invention further provides a composition based on at least one hydraulic or organic binder, and/or based on at least one inorganic or organic filler, containing a bitumen emulsion as defined above.

The invention also covers the use of an aqueous bitumen emulsion for formulating a composition selected in the group consisting of mortars, mortar-adhesives, coatings for facings, finishing coatings, paints, concretes, keying primers, waterproofing primers, roadway seams, and sealing mortars, the emulsion comprising, expressed as a percentage of total emulsion weight:

50% to 70% bitumen;
0.5% to 10% surfactant
water to make up to 100%,
said surfactant being constituted by at least one non-ionic surfactant selected from the group consisting of:
polyethoxylated alkylphenols of HLB value comprised between 13 and 17;
copolymers of EO and PO;
polyethoxylated fatty alcohols of HLB value comprised between 12 and 15;
epoxydated ethoxylated and/or propoxylated surfactants;
and polyvinyl alcohols of molecular weight comprised between 10,000 and 150,000.

Finally, the invention also provides a constructional materials kit, comprising, firstly, the bitumen emulsion as defined or used previously or obtained by the method described previously, and, secondly, at least one hydraulic or organic binder, and/or at least one inorganic or organic filler.

Preferably, the bitumen is selected from bitumens emulsifiable at atmospheric pressure, such as the 40 to 220 penetrability index grades (some tenths of a millimetre penetration). Deasphaltated or synthetic grades, as well as mixtures plastified using polymers can also be employed for particular applications, the grades from synthesis being useful in view of the possibility of pigmenting them.

The thickeners are preferably chosen from polysaccharides such as cellulosic thickeners, vegetable gums (for example, carob gum, guar gum, gum tragacanth, karaya gum, starch, alginates, gum arabic), gums produced by bacterial fermentation (for example xanthane gum, welan gum), and expanded clays, (for example attapulgite, sepiolite, bentonite). Other thickeners of the synthetic type can optionally be used for adjusting suspension rheology such as associative or non-associative acrylic polymers and polyurethanes. Welan gum has proved not to lead to substantial foam formation, unlike other gums, and for this reason it is the preferred thickener for the emulsions according to the present invention.

An anti-foaming agent can optionally be incorporated in the emulsion for avoiding foam formation and facilitating the incorporation of the bitumen. The anti-foaming agents are selected from products known to the skilled person such as, for example, mixtures of silica and mineral oil, polysiloxanes, tributylphosphate, and metallic soaps.

Preferably, the hydraulic binder is constituted by at least one hydraulic binder selected from the group consisting of a Portland cement or equivalent, high-alumina cement and a calcium sulphate.

In one preferred embodiment, the organic binder consists of at least one polymer binder, chosen from the group consisting of butadiene styrenes, acrylic copolymers, and ethylene polyvinylacetates.

Preferably, the mineral filler consists of at least one generally inert filler of the type habitually used in formulations for the building and civil engineering industries, chosen from the group consisting of sand, aggregates, silica, calcium carbonate, calcium silicates, barium sulfates, talc, mica.

Preferably, the organic filler consists of at least one organic filler chosen from the group consisting of polymer fibers, cellulose fibers, and/or polystyrene balls.

The invention will be better understood with reference to the detailed description of several preferred embodiments, provided solely by way of illustration, and with reference to the attached drawing, in which:

FIG. 5 is a graph showing hydration observed by X-ray diffraction of a Portland cement-based mortar containing a variable percentage of EO/PO copolymer;

FIG. 6 is a graph showing bending strength of a Portland cement-based mortar containing a variable percentage of EO/PO copolymer;

FIG. 7 is a graph showing compression strength of a Portland cement-based mortar containing a variable percentage of EO/PO copolymer;

FIG. 8 is a graph showing bending strength of an high-alumina cement-based mortar containing a variable percentage of EO/PO copolymer;

FIG. 9 is a graph showing compression strength of a high-alumina cement-based mortar containing a variable percentage of EO/PO copolymer.

EXAMPLES

Figure 1:
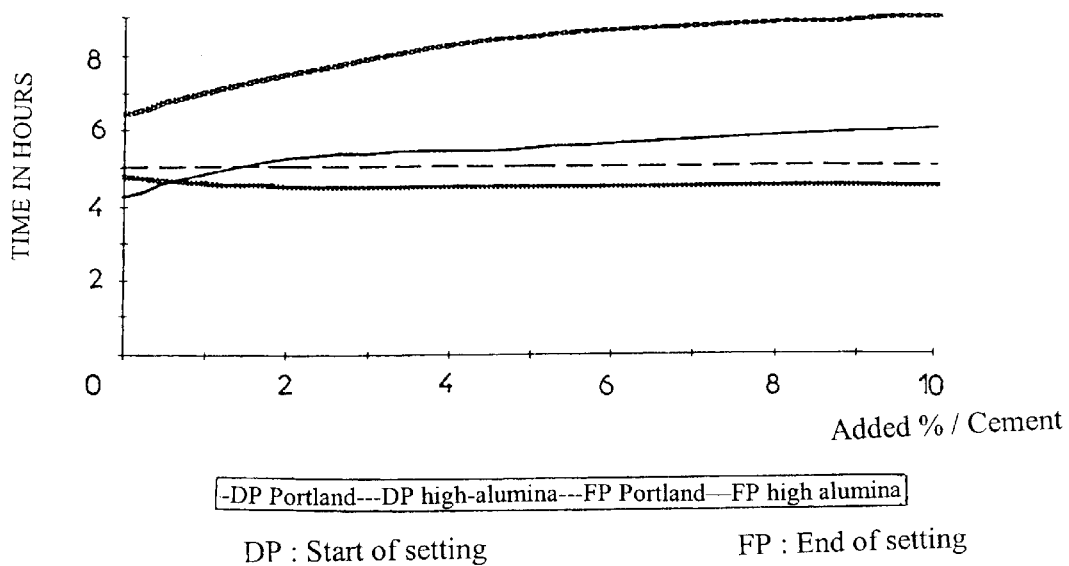
FIG. 1 is a graph showing changes in setting starting and ending time of high-alumina cement- or Portland cement-based mortar containing a variable percentage of EO/PO copolymer.

Several examples of bitumen emulsions stabilised according to the invention are given below in Table II by way of indication, all percentages being expressed based on total emulsion weight. The emulsions were obtained by proceeding in the following manner:

preparing the aqueous phase;

then adding to the aqueous phase, a surfactant consisting of at least one ethylene oxide and propylene oxide copolymer in a PO/EO ratio comprised between 1.5 and 10, for example the one commercially available under reference LC 818 C from Sidobre Sinnova;

heating the aqueous phase to about 60° C.;

incorporating the bitumen previously heated to 140° C. into the aqueous phase under powerful mechanical stirring, for example using a rapid disperser of the Rainery type, provided with a deflocculating vane, at a speed of 800 rpm.

The emulsion had a miscellar size comprised between a 0.5 μm and 15 μm.

TABLE II

|   | Example 1 | Example 2 |
|---|---|---|
| 1 | Viatotal 80/100 bitumen 60% | Viatotal 80/100 bitumen 65% |
| 2 | LC 818 C 3% | LC 818 C 3.5% |
| 3 | Kelcocrete K1C376 0.1% | Esacol ED 10 0.2% |
| 4 |  | Rhodoline DF 6681 0.1% |
| 5 | water 36.9% | water 31.2% |

1: Viatotal bitumen available from Total Raffinage, Division des Bitumes.

2: (non-ionic surfactant): LC 818 C available from Sidobre Sinnova.

3: (thickener), Kelcocrete 1 C376 (Welan gum) available from Monsanto. 3: (thickener): Esacol ED 10 (guar gum) available from Lamberti. 4: (anti-foaming agent): Rhodoline DF 6681 available from Rhodia.

In terms of industrial applications, bitumen emulsions according to the invention can find very numerous applications optionally in combination with at least one organic or inorganic hydraulic binder and/or at least one inorganic or organic filler. Examples of hydraulic binders are, for example, Portland cements, high aluminas, slag-based cements, and calcium sulphate. Additionally, the flexibility and ductility characteristics of the emulsions according to the invention make them suitable for replacing a large number of polymers in dispersion in very varied compositions, at very reduced cost.

The emulsions thus made can notably be used in the following applications:

keying primers for flooring mortars and smoothing or surface finishing coatings, waterproofing primers, adhesives for synthetic coverings (carpeting, PVC tiles, etc . . . ) for floors and for walls, adhesives in paste form for tiles, thick plastic coatings and matt paints containing fillers, anticorrosive coatings for metal supports, and hydraulic binder-based compositions such as cements, plasters, anhydrite and mixtures thereof, notably adhesive mortars, facing coverings, special mortars and coatings, such as waterproofing mortars, seams for roads and highways, sealing mortars for roads, floor and wear-resistant mortars, coatings for smoothing and coatings for finishing;

road and highway concretes and surfaces.

The bitumen emulsions according to the invention can, notably, be used for providing compositions based on mixed binders: hydraulic binders—hydrocarbon binders, more particularly for sand and gravel and for foundations for roads, for floors, and cinders from burning household waste for ground fill, and for highway shaping and foundation layers. Emulsions according to the invention are also suitable for obtaining cold-application products for substituting hot coating products, for road surface layers. In such a case, bitumen emulsion according to the invention makes up from 0.5 to 6% by weight of the composition.

Because of the possibilities of long-term storage of the emulsion according to the invention and in view of its perfect compatibility and homogeneity, and the absence of influence on setting of Portland cement type hydraulic binders or equivalents, mixing of compositions based on these mixed binders for road making applications can be performed in one single and the same mixer, either in a conventional cement-bound sand and gravel unit or on the ground at the site, or in units remote from the site.

In particular, bitumen emulsions according to the invention can be advantageously applied in the processes employed habitually in France such as Flexocim® (cf. European patent 545,740) of the Beugnet company, or the Stabicol process (cf. European patent 535,282) from the Colas company, this being achieved thanks to simplification of the mixing steps and/or supply logistics for sand and gravel compositions.

Example 1

In order to demonstrate the properties of the bituminous emulsions according to the invention in formulations containing an inorganic or organic filler, a series of tests was performed on a bitumen-cement mortar containing an emulsion according to the invention having a 60% by weigh bitumen concentration (70/100 pigmentable from Shell) in an amount of 5% by weight of the cement, with 0.1% Welan gum as thickener, and containing as surfactant a copolymer of propylene oxide and ethylene oxide of molecular weight around 2000, in an amount of 5% based on the bitumen weight. The mortar compositions was as follows:

normal sand 1350 g

Portland cement 450 g bitumen emulsion 300 g water to a desired consistency

The water/cement (E/C) mix proportion was 0.8. The bituminous emulsion had been previously poured into a Perrier mixer and then the cement and sand were added successively with mixing. Further water was optionally added to the mixture to obtain the correct mix.

A similar mortar composition was also made up containing a similar amount of high-alumina cement.

System stability was evaluated visually by checking the homogeneity of the mixture and absence of any flocculation. The emulsion was stable when stored for longer than six months.

Figure 2:
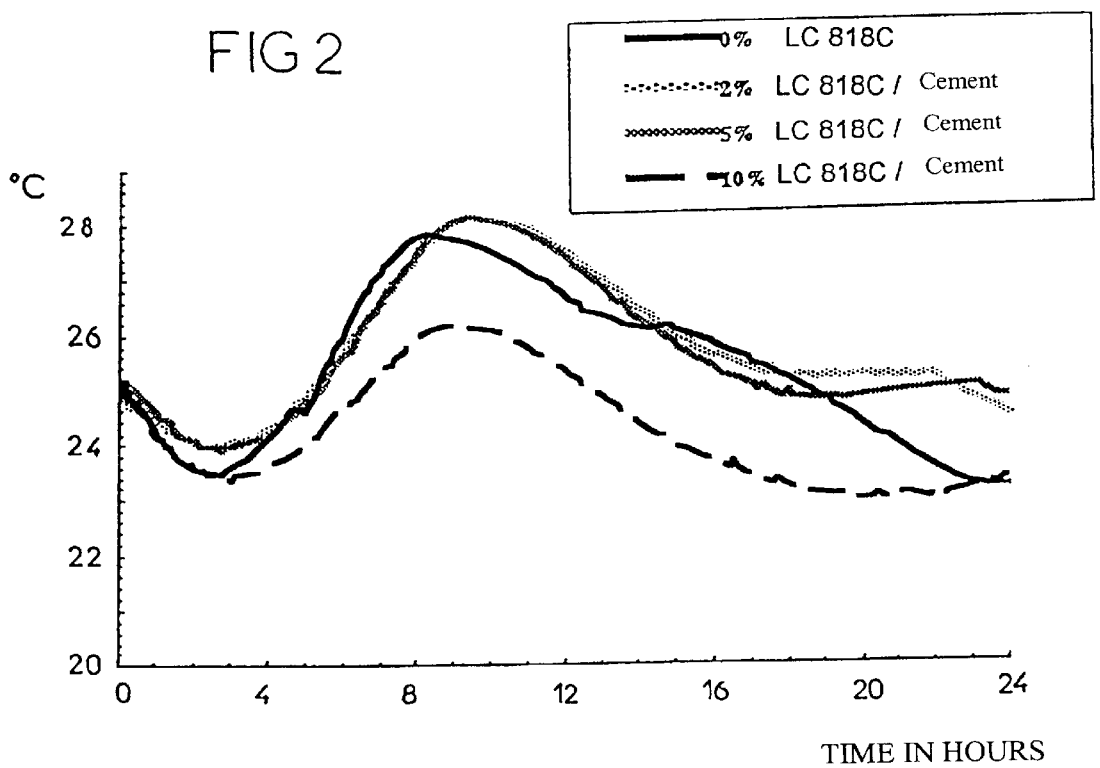
FIG. 2 is a graph showing hydration curves for a Portland cement-based mortar containing a variable percentage of EO/PO copolymer.
Figure 3:
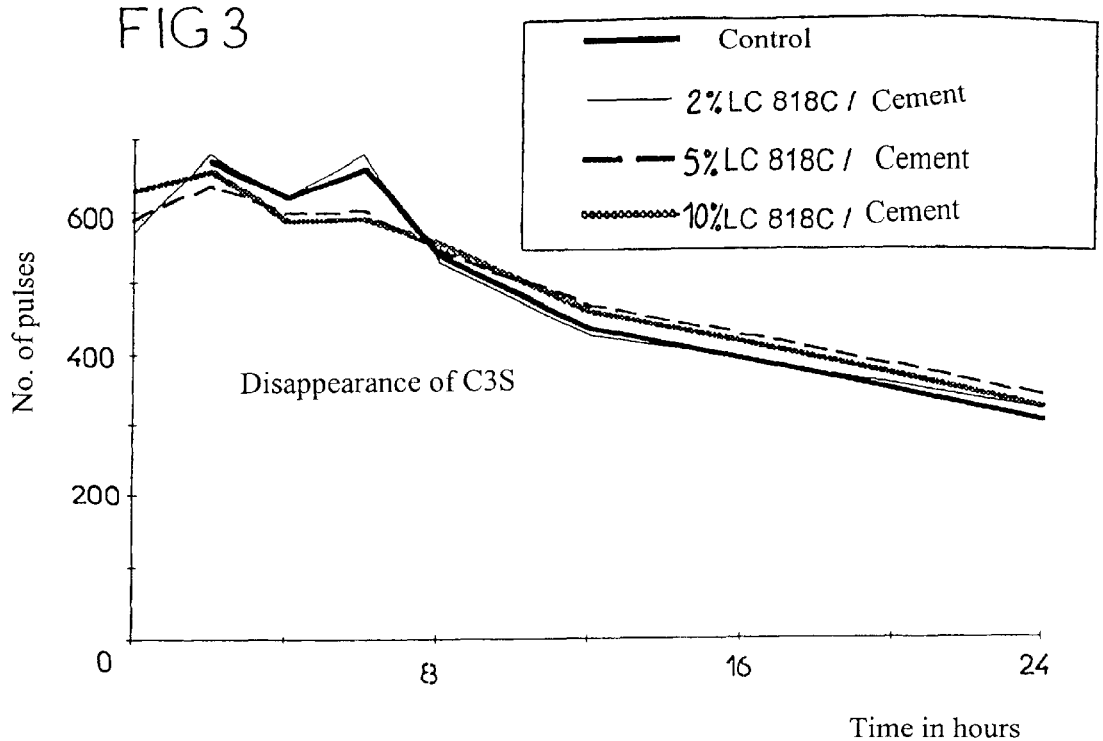
FIG. 3 is a graph showing hydration observed by X-ray diffraction of a Portland cement-based mortar containing a variable percentage of EO/PO copolymer.
Figure 4:
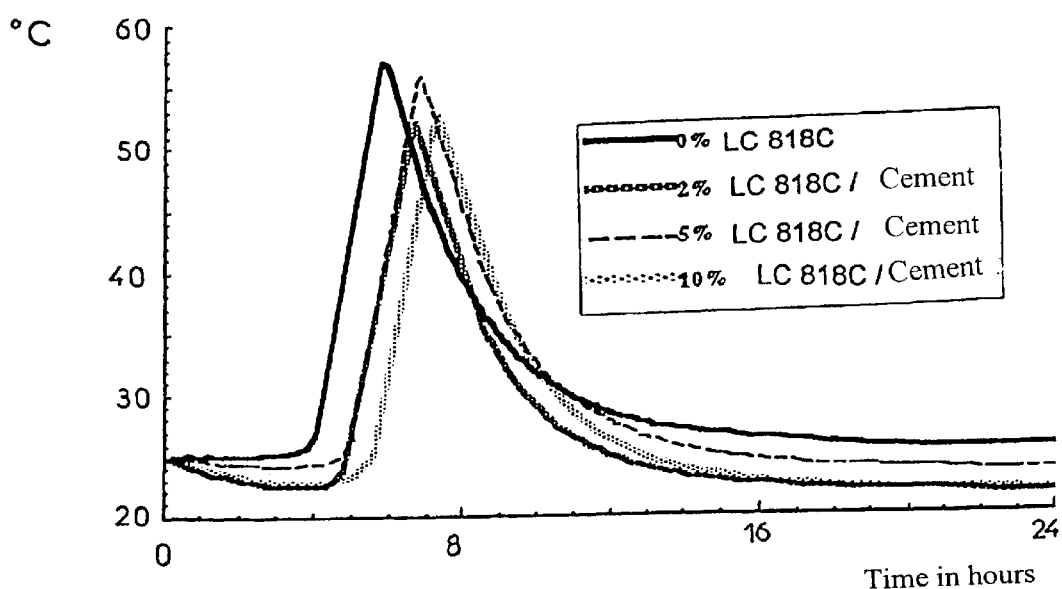
FIG. 4 is a graph showing hydration curves for a high alumina cement-based mortar containing a variable percentage of EO/PO copolymer.

The mortars were then analysed to determine the effect of the surfactant, incorporated in different amounts into the emulsion, on setting time and hydration, monitored by X-ray diffraction. In order to monitor hydration by X-ray diffraction analysis, it was necessary to first dissolve the bitumen using a solvent. This can be done using heptane or white spirit without introducing any difference, when compared to traditional washing with acetone. The results on setting time and hydration are illustrated in FIGS. 1 and 2–5 respectively. These figures do indeed show that the chosen copolymer surfactant has practically no influence on hydration on Portland and high-alumina cement.

Example 2

Additionally, in order to determine the influence of surfactants according to the invention entering into the composition comprising an inorganic or organic filler, on the mechanical properties of said compositions, mortars similar to the mortars previously described were made up, based on Portland cement or high-alumina cement. The mortars were introduced by ramming into polystyrene moulds. The compositions were the following:

normal sand 1350 g normal sand 1350 g

Portland cement 450 g high alumina cement 450 g anti-foaming agent 4.5 g anti-foaming agent 4.5 g water/cement ratio 0.5 water/cement ratio 0.45

Mechanical properties were studied using three-point bending and in compression after different periods of time, the results being given on the graphs of FIGS. 6–9. It will be noted that in a relatively small proportion, the selected surfactant has no major influence on mechanical properties.

Example 3

The bitumen emulsions according to the present invention are further compatible with the majority of polymer dispersions on the market and can be employed optionally mixed with them. Thus, and in order to determine compatibility of emulsions according to the invention in the compositions comprising an organic binder, such as polymers, applicant made mixtures of latex of different natures and bitumen emulsions containing the chosen surfactant.

The bitumen emulsion utilizable for these tests was made using a 70/100 pigmentable bitumen available from Shell. The surfactant system was a 3.5% by weight copolymer and 0.5% by weight nonylphenol 15 EO mixture. The thickener was a Welan gum in an amount of 0.05% by weight. All weight percentages given are based on the total emulsion weight. The polymers and bitumen were mixed in equivalent weight proportions, stability being visually checked at a temperature of 20° C.

The following polymers were tested:

an acrylic styrene (Rhodopas DS 910, Rhodia);

a butadiene styrene (Rhodopas SB 112, Rhodia);

an acrylic copolymer (Primal 2727, Rohm & Hass);

an ethylene vinylacetate (Vinnapas CEP 15, Wacker).

No problem was observed during mixing of the polymers with the bitumen emulsion. The mixture obtained was homogeneous and remained perfectly stable without phase separation or flocculation.

For emulsions produced from polyvinyl alcohol and epoxy surfactant, examples A and B are given below in table III

TABLE III

| | Example A | Example B |
| --- | --- | --- |
| 1 | Viatotal 80/100 bitumen 56% | Viatotal 80/100 bitumen 50% |
| 2 | Airvol 54OS 2.4% | Prox E 141 4.5% |
| 3 | Esacol ED 10 0.1% | |
| 4 | | tributylphosphate 0.2% |
| 5 | water 41.5% | water 45.3% |

1. Viatotal bitumen available from Total Raffinage, Division des Bitumes.

2. Prox E141: epoxy and proproxy surfactant: available from Protex; Airvol 540S: polyvinyl alcohol: available from Air Products.

3. Thickener: Esacol ED 10 available from Lamberti.

4. Anti-foaming agent: tributyl phosphate available from Protex.

Example 4

Gel stability tests were performed by successively bringing bitumen emulsions according to the invention to temperatures of 0° C. and then −5° C. over three days for each test. The two emulsions tested were made from Total 70/100 bitumen as regards the first and, Shell 70/100 pigmentable as regards the second, the same stabilising system being used as in the preceding example. The emulsions tested did not solidify and showed excellent stability, no flocculation being noticed. Return to ambient temperature (20° C.) did not show any particular problem.

Example 5

In order to check feasibility of a plastic roughcast type filled polymer system, thick plastic coatings were made using a polymer dispersion and mixtures of polymer dispersion and bitumen emulsion according to the invention, for the binder component.

The following formulation was adopted:

| | |
|---|---|
| Cellulose ether (Tylose MHEC 10000, from Clariant) | 2.5 |
| Biocide (Troysan 186, Troy Co.) | 0.2 |
| Water | 49.0 |
| 28% ammonia solution | 1.1 |
| Dispersant (Dispex A40, from Applied Colloids) | 2.7 |
| Anti-foaming agent (Nopco 8034, from Henkel Nopco) | 2.0 |
| Titanium dioxide (Tioxide RHD 2, from Tioxide) | 61.5 |
| $CACo_3$ (Mikhart 40, from Provencale de Travaux) | 144 |
| (Mikhart 130) | 91.8 |
| Silica (BE 31, from Sifraco) | 297.5 |
| Siliceous granulates (16/14/3 silica + kaolin) | 123 |
| Dry binder | 102.5 |
| Water (incorporated with binder) | 102.5 |
| Coalescence agent (butyldiglycol) | 15.5 |
| Thickener (Rheo 3000, from Coatex) | 4.2 |

A control formulation was made using an acrylic styrene dispersion as a binder, the polymers chosen being Rhodopass DS 1029 from Rhodia.

Tests were done in which the polymer binder was partially substituted by bitumen emulsion. To do this, an emulsion made using 70/100 bitumen from Total and a pigmentable bitumen emulsion (70/100 from Shell) of bitumen concentration 60% were chosen. The surfactant system adopted consisted of 3.5% copolymer, 0.5% nonylphenol 15 EO, the thickener being Welan gum in an amount of 0.05%.

The formulation was made up as follows:

the water, ammonia, cellulose ether, biocide, dispersant and anti-foaming agent were incorporated into a stainless steel beaker and continuously agitated at 1500 rpm for 30 minutes, the pigment and fillers were then introduced into the solution and kept agitated until complete dispersion (around 30 minutes), the binder was then added to the dispersion (latex and/or bitumen emulsion) and the system homogenised for 10 minutes, after this, the coalescence agent and then the thickener were incorporated.

No particular problem was observed as regards the stability of the mixtures.

Example 6

Tests were also carried out on anticorrosive paints for buildings using a binder system of the polymer dispersion type in which the polymer was partially substituted by a bitumen emulsion.

The adopted formula was as follows:

| | |
|---|---|
| Water | 464 |
| 28% ammonia solution | 1 |
| Dispersant (Dispex A40, Allied Colloids) | 0.5 |
| Anti-corrosion pigment | 87 |
| (Actirox 213 from Colores Hispania) | |
| Filler (Micarvor 20, Kaolins d'Arvor) | 87 |
| Iron oxide (Bayferrox 303T, Bayer) | 29 |
| Anti-foaming agent (Nopco 8034, Henkel Nopco) | 3.5 |
| Dry binder | 291.5 |
| Coalescent agent (butyldiglycol) | 29 |
| Thickener (Rheo 2100, from Coatex) | 7.5 |

The binder portion consisted of an acrylic styrene dispersion for the control (Acronal 290 D from BASF) and two tests were carried out using bitumen emulsion, substituting 50% of the dry binder in the first case and the totality in the second case. The bitumen emulsion adopted was a 60% pigmentable bitumen emulsion (70/100 Shell) containing 3.5% copolymer and 0.5% nonylphenol 15 EO, with 0.05% Welan gum as the thickener.

The manner of preparation applied was as follows:

a mother paste was prepared using water, the dispersing agent, the pigments and filler, while keeping it stirred in a stainless steel beaker at a speed of 2000 rpm, the binder was then incorporated, with stirring, followed by homogenization, the ammonia, anti-foaming agent, coalescent and thickener were then added to the mixture as a final step.

The formulae thus obtained were applied to degreased steel sheets and then dried under laboratory conditions (23° C., 50% relative humidity) for one week. Incisions were then made in the sheets and they were subject to a saline mist test (ISO 9227 standard) for 100 hours.

At the end of the test, the sheets were rinsed with water and examined visually for corrosion (width of rust at the cut, blistering, and corrosion over the whole field).

The following results were obtained:

Control: width of rust at incision: 2 mm, significant blistering, low corrosion over whole field.

50% binder substituted by bitumen: width of rust at incision: 2 mm, low blistering, medium whole field corrosion.

100% of binder substituted by bitumen: width of rust at incision: 5 mm, low blistering, very significant whole field corrosion.

Replacing all the polymer binder with bitumen emulsion caused an increase in corrosion phenomena, but partial replacement of the binder by bitumen emulsion showed, on the contrary, results similar to the control after the saline mist tests.

Example 7

In order to check compatibility of the bitumen emulsions with liquefiers employed in certain mortar formulations, a test was carried out on a formula containing a sodium sulfonate formol polymelamine type liquefier.

The formula adopted was as follows:

| | |
|---|---|
| Bitumen emulsion: | 150 g |
| Anti-foaming agent: Nopco 8034: | 4.4 g |
| Cement CPA CEM 1 52.5 R from St Pierre la Cour: | 450 g |
| Normal sand: | 1350 g |
| Water: | 171 g |

The bitumen emulsion adopted was the same as that in example 5. To liquefy the mortar, 1% of liquefier (Melment F10) based on the powder was incorporated into the mixture. The mix was made up using a low speed Perrier mixer for 2 minutes. In order to measure mixture fluidity, spreading was done using an ASTM cone (small diameter: 70 mm, large diameter 100 mm, height 50 mm).

The following results were obtained:

Control: spreading of 100 mm

Liquefied mortar: spreading of 210 mm

It was noted that the bitumen emulsion did not influence the action of the liquefier. Also, compatibility with the liquefier polymer was good and no problem of flocculation was observed. Bitumen emulsions according to the invention can be used in liquefied formulae such as those for floor smoothing, finishes, binders, special mortars.

Example 8

Like in example 5, a thick plastic coating was made using a mixture of a polymer dispersion and bitumen emulsion, having the following formula:

| | |
|---|---:|
| cellulose ether (Tylose MHEC 10000, from Clairant) | 2.5 |
| biocide (Troysan 186, from Troy company) | 0.2 |
| water | 49 |
| 28% ammonia solution | 1.1 |
| dispersant (Dispex Ato, Allied Colloids) | 2.7 |
| anti-foaming agent (Nopco 8034, Henkel Nopco) | 2.0 |
| titanium dioxide (Tioxide RHD2, Tioxyde Co.) | 61.5 |
| $CaCO_3$: | |
| (Mikhart 40, Provencale de Travaux) | 144 |
| (Mikhart 130, Provencale de Travaux) | 91.8 |
| silica (BE 31, Sifraca) | 297.5 |
| siliceous granulate (16/14/3 silica and kaolin) | 123 |
| dry binder | 102.5 |
| water (incorporated with binder) | 102.5 |
| coalescent agent (butylglycidol) | 15.5 |
| thickener (Rheo 3000, Coatex) | 4.2 |

The control was the same as in example 5, the polymer chosen being Rhodopos DS 1029 from Rhodia.

As above, an emulsion was made using 70/100 pigmentable bitumen from Shell having a bitumen concentration of 60%. The surfactant used in the emulsion was a nonylphenol 15 EO in a concentration of 3%, and, additionally, Welan gum was added in an amount of 0.05% as thickener, along with an anti-foaming agent (for example Nopco 8034) in an amount of 1%.

The formulation was made up in the same way as in example 5. Tests were carried out with the polymer binder substituted by bitumen emulsion in an amount of 20%. No problem of formulation or incompatibility was observed.

Example 9

A mortar-adhesive was made up using Portland cement with the following formulae:

| Formula A | |
|---|---:|
| Portland cement | 350 g |
| sand | 590 g |
| cellulose ether | 3 g |
| (Culminal MHEC 15000 PFF from Aqualon) | |
| anti-foaming agent | 2 g |
| (Nopco 8034, Henkel Nopco) | |
| calcium formiate | 5 g |
| polymer (Primal 2727, Rohm and Haas) | 100 g |
| water | 175 g |

| Formula B | |
|---|---:|
| Portland cement | 350 g |
| sand | 590 g |
| cellulose ether | 3 g |
| (Culminal MHEC 15000 PFF from Aqualon) | |
| anti-foaming agent | 2 g |
| (Nopco 8034, Henkel Nopco) | |
| calcium formiate | 5 g |
| bitumen emulsion | 82 g |
| water | 193 g |

The bitumen emulsion was prepared using 70/100 Viatotal bitumen, the bitumen concentration being 61%. The surfactant consisted of EO and PO copolymer (LC818C, Sidobre Sinnoval) in an amount of 3.5%, and polyethoxylated nonylphenol 15 EO in an amount of 0.5%. Welan gum was also added to the emulsion as a thickener in an amount of 0.05%.

The two mixtures were made up using a Perrier mixer, first introducing the liquid constituents followed by the constituents in powder form with stirring at 140 rpm for 90 second. Samples were taken in order to measure mechanical characteristics after seven days setting and 28 days setting. For this, the mortars were cast into expanded polystyrene moulds of 4 cm×4 cm×16 cm size. The samples placed in the moulds were kept at 23° C. and 50% relative humidity.

Flexural modulus was measured using a dynamometer at a rate of 1 mm/min. Similarly, in order to characterise tear-off resistance, 5 cm×5 cm ceramic tiles were bonded using mortar-adhesives onto a concrete support. Next, hooks were fastened onto the ceramic tiles and concrete support using a fast epoxy adhesive and the assembly was subjected to a traction of 1 mm/min using a dynamometer. The comparative values obtained from the two mortar adhesives are given in table IV below:

TABLE IV

| | Young's modulus | Tear-off resistance |
|---|---|---|
| Formula A after 7 days | 2.07 GPa | 1.21 MPa |
| Formula B after 7 days | 1.78 GPa | 1.29 MPa |
| Formula B after 28 days | 2.41 GPa | 1.57 MPa |
| Formula B after 28 days | 2.13 GPa | 1.48 MPa |

One can note that where bitumen substitutes polymer, although the mortar-adhesive has better flexibility (lower Young's modulus), tear-off values are close to those for the mortar-adhesive without polymer substitution.

Example 10

Sealing mortars were made using Portland cement associated with polymers and comparisons were made with a mortar obtained from a mixture of Portland cement and a bitumen emulsion according to the invention.

The suppliers and natures of the constituents given below are given in Table V below:

TABLE V

| Constituents | Supplier | Nature |
|---|---|---|
| Portland cement S.P.L.C. | Lafarge | Portland type cement. Origin: St Pierre la Cour S.P.L.C.) reference: CPACEM1 52.5 R |
| Sand PE2L | Fulchiron | White 99% silica sand (50–200 μm) |
| Acronal S400 | BASF | acrylic-type latex with 57% dry extract |
| Rhodapass SB 112 | Rhodia | styrene-butadiene type latex with 50% dry extract |
| Bitumen emulsion | Lafarge | emulsion containing 60% bitumen |
| Nopco 8034 | Sidobre Sinnova | anti-foaming agent: silica dispersed in a mineral oil |

TABLE V-continued

| Constituents | Supplier | Nature |
|---|---|---|
| Culminal MHEC 15,000 PFE | Hercules or Aqualon | thickener: MHEC-type non-ionic cellulose ether. Molecular weight: 15,000 g/mol |

| FORMULA C | |
|---|---|
| Portland cement S.P.L.C. | 100 g |
| Sand PE2L (White 99% silica sand (50–200 µm)) | 233 g |
| acrylic latex with 57% dry extract (Acronal S400) | 35 g |
| water | 55 g |
| thickener cellulose ether (Culminal MHEC 15000) | 0.3 g |
| anti-foaming agent (Nopco 8034) | 0.7 g |

| FORMULA D | |
|---|---|
| Portland cement S.P.L.C. | 100 g |
| Sand PE2L (White 99% silica sand (50–200 µm)) | 233 g |
| styrene-butadiene latex with 50% dry extract (Rhodapass SB 112) | 40 g |
| water | 50 g |
| cellulose ether thickener (Culminal MHEC 15000) | 0.3 g |
| anti-foaming agent (Nopco 8034) | 0.7 g |

| FORMULA E | |
|---|---|
| Portland cement S.P.L.C. | 100 g |
| Sand PE2L (White 99% silica sand (50–200 µm)) | 233 g |
| bitumen emulsion | 33.3 g |
| water | 56.7 g |
| cellulose ether thickener (Culminal MHEC 15000) | 0.3 g |
| anti-foaming agent (Nopco 8034) | 0.7 g |

The mortars were made up in the same way as in example 9.

In order to characterise sealing properties, the 4 cm×4 cm×16 cm dimension samples were immersed in water for 24 hours. The samples were then removed from the water, dried with absorbent paper and weighed to check how much water they had taken up.

Water take-up in % was calculated from the following equation:

$$RE=[(mF-ml)/ml]\times 100$$

where: ml is the initial weight of the sample before immersion mF is the weight of the sample after immersion.

The results are given in table VI below, measurements being made after 3 days, 7 days and 28 days setting of the mortars.

TABLE VI

| | formula C | formula D | formula E |
|---|---|---|---|
| RE 3 days | 5.9% | 2.8% | 2.5% |
| RE 7 days | 2.0% | 3.9% | 4.0% |
| RE 28 days | 1.0% | 5.2% | 2.0% |

One can note that the bitumen emulsion provides characteristics that are close to or even better than those of the polymers.

Example 11

Like for example 9, mortar-adhesives were made using mixtures of Portland cements and polymer or bitumen emulsion. The formulae and operating mode were the same as in example 9. The bitumen emulsion was prepared using Shell pigmentable 70/100 bitumen, with a bitumen concentration of 61%. The surfactant consisted of nonylphenol polyethoxylated 15 EO in an amount of 3.5%, 0.05% Welan gum and 2% anti-foaming agent (Nopco 8034) being also added to the emulsion.

Like in example 9, mechanical characteristics were measured after 7 and 28 days setting time.

The bitumen-based mortar formula was modified by adding 2% anti-foaming agent of Nopco 8034 type (formula F). Values for tear-off and Young's modulus are given in Table VII below:

TABLE VII

| | Young's modulus | Tear-off resistance |
|---|---|---|
| Formula A after 7 days | 2.07 GPa | 1.21 MPa |
| Formula F after 7 days | 1.42 GPa | 1.03 MPa |
| Formula A after 28 days | 2.41 GPa | 1.57 MPa |
| Formula F after 28 days | 1.66 GPa | 1.15 MPa |

Here, greater flexibility of the bitumen can be noted while still maintaining acceptable tear-off resistance.

The emulsions obtained using the invention are consequently highly stable in the presence of various additives (liquidifiers, dispersants, thickeners, anti-foaming agent, pigments, fillers, coalescents, etc). Similarly, mixtures of dispersions of polymers of different natures and bitumen emulsions do not present a problem. In every case, the bitumen emulsion provided properties close to those obtained using polymer dispersions.

Example 12

Bedding materials for roads and highways were made using hydraulic binder (Rolac 125) from the following formulae (100% represents the dry materials weight):

| Formula F | |
|---|---|
| Hydraulic binder: Rolac 125: | 3.5% |
| Bedding material: Estaque limestone 0/20 mm | 96.5% |
| Aqueous bitumen emulsion | 0% |
| Water: | 5% |

| Formula G | |
|---|---|
| Hydraulic binder: Rolac 125: | 3.5% |
| Bedding material: Estaque limestone 0/20 mm: | 94.75% |
| Aqueous bitumen emulsion | 1.75% |
| Water: | 5% |

| Formula H | |
|---|---|
| Hydraulic binder: Rolac 125: | 3.5% |
| Bedding material: Estaque limestone 0/20 mm: | 93% |
| Aqueous bitumen emulsion | 3.5% |
| Water: | 5% |

Rolac 125 is a binder for treating clinker and cinder-based bedding material containing additives, available from Lafarge Ciments.

The control formula is formula F, which does not contain bitumen emulsion.

The aqueous bitumen emulsion was prepared using Viatotal 80/100 bitumen (available from Total), with a 60% bitumen concentration. The surfactant consisted of 3.5% EO and PO copolymer (LC 818C, Sidobre Sinnova), and of 0.5% nonylphenyl ethoxylated 150 EO; 0.95% Welan gum as thickener and 0.1% anti-foaming agent (Nopco 8034 from Henkel) were added to the emulsion.

Welan gum was also added to the emulsion by way of thickener in an amount of 0.05%, along with 0.1% anti-foaming agent (Nopco 8034 from Henkel Nopco).

Mixtures were made up using a mixer for treated bedding material (LCPC) rotating at slow speed, with the following operating mode:

introduction of constituents in powder form: 30 seconds, introduction of water: 15 seconds, mixing: 1 minute introduction of the emulsion: 15 seconds, mixing: 1 minute.

The samples were then moulded by vibration-compression in PVC moulds in order to measure:

workability time by dynamic sounding (16*32 cm samples) according to the French NF P 98-231-5 Standard, direct traction (16*32 cm samples centrally hollowed to provide a surface area of 154 cm$^2$) according to French standard NF P 98-232-2. The samples in their mould were kept at 20° C.

Comparative values obtained on the three bedding materials are given in table VIII.

It can be noted that adding bitumen to the bedding material formula causes a substantial drop in Young's modulus without affecting breaking strength. This amounts to increasing material flexibility while maintaining strength properties, allowing road and highway re-dimensioning and reduction of thickness of the bedding layer.

TABLE VIII

| | | formula F | formula G | formula H |
|---|---|---|---|---|
| 28 DAYS | density | 2.308 | 2.308 | 2.226 |
| | breaking strength (Td) | 0.93 MPa | 0.87 MPa | 0.89 MPa |
| | Modulus (E) | 19,930 MPa | 15,920 MPa | 9280 MPa |
| | E/(T d*1000) | 21.4 | 18.3 | 10.4 |
| 60 DAYS | breaking strength (Td) | 0.97 | 0.95 | 0.97 |
| | Modulus (E) | 22,500 | 18,900 | 12,610 |
| | E/(Td*1000) | 23.2 | 19.9 | 13.0 |

What is claimed is:

1. An aqueous bitumen emulsion comprising a surfactant, from 0 to 5% thickener, from 0 to 1% anti-foaming agent, water to make up to 100%, wherein the bitumen is in a weight proportion of 50 to 70% and the surfactant in a weight proportion of 0.5 to 10% and consists of a copolymer of ethylene oxide and propylene oxide, of PO/EO (propylene oxide/ethylene oxide) ratio comprised between 1.5 and 10.

2. The emulsion according to claim 1, wherein the molecular weight of the ethylene oxide and propylene oxide copolymer is comprised between 1000 and 2200.

3. The emulsion according to claim 1, further comprising a hydrotropic agent consisting of a non-ionic surfactant.

4. The emulsion according to claim 3 wherein the hydrotropic agent is selected from the group consisting of the following non-ionic surfactants:

polyethoxylated alkylphenols of HLB value comprised between 13 and 17;

polyethoxylated fatty alcohols of HLB value comprised between 12 and 15.

5. The emulsion according to claim 4, wherein the hydrotropic agent is a polyethyoxylated alkylphenol of HLB value comprised between 13 and 17, and is selected from the group consisting of nonylphenol 10 EO to 20 EO, and tributylphenol 11 EO to 30 EO.

6. The emulsion according to claim 4, wherein the hydrotropic agent is a polyethoxylated fatty alcohol of HLB value comprised between 12 and 15.

7. The emulsion according to claim 1, wherein the surfactant comprises a mixture of a copolymer constituted by an ethylene oxide and propylene oxide copolymer of PO/EO ratio comprised between 1.5 and 10 and having a molecular weight of 2000, and of a polyethoxylated nonylphenol 10 EO to 20 EO.

8. The emulsion according to claim 7, wherein the percentages of the surfactant constituted by the mixture of ethylene oxide and propylene oxide copolymer, and nonylphenol 10 EO to 20 EO, are from 0.7% to 5% and from 0.1% to 1% respectively.

9. The emulsion according to claim 3 comprising at least 3% of ethylene oxide and propylene oxide copolymer, with a copolymer/hydrotropic surfactant ratio comprised between 5 and 7.

10. The emulsion according to claim 1, wherein the bitumen is a bitumen able to be emulsified at atmospheric pressure, selected from the group consisting of penetrability index (10ths of a millimetre penetration) grades comprised between 40 and 220, de-asphaltated grades, synthetic grades, and mixtures plastified using polymers.

11. The emulsion according to claim 1, wherein the thickener is selected from the group consisting of cellulosic thickeners, vegetable gums, gums produced by bacterial fermentation, expanded clays, and synthetic thickeners.

12. The emulsion according to claim 11, wherein the thickener is selected from the group consisting of carob gum, guar gum, gun tragacanth, karaya gum, starch, alginates, gum arabic, xanthane gum, welan gum, atapulgite, sepiolite, bentonite, associative or non-associative acrylic polymers, and polyurethanes.

13. The emulsion according to claim 12, wherein the thickener is welan gum.

14. The emulsion according to claim 1, wherein the anti-foaming agent is selected from the group consisting of mixtures of silica and mineral oil, polysiloxanes, tributylphosphate, and metallic soaps.

15. An aqueous bitumen emulsion comprising:
from 50 to 70 wt % of a bitumen able to be emulsified at atmospheric pressure, selected from the group consisting of penetrability index (10ths of a millimetre penetration) grades comprised between 40 and 220, de-asphaltated grades, synthetic grades, and mixtures plastified using polymers;
from 0.5 to 10 wt % of a surfactant consisting of a copolymer of ethylene oxide and propylene oxide, of PO/EO (propylene oxide/ethylene oxide) ratio comprised between 1.5 and 10;
from 0 to 5 wt % of a thickener selected from the group consisting of carob gum, guar gum, gum tragacanth, karaya gum, starch, alginates, gum arabic, xanthane gum, welan gum, atapulgite, sepiolite, bentonite, associative or non-associative acrylic polymers, and polyurethanes;
from 0 to 1 wt % anti-foaming agent;
water to make up to 100%.

16. The emulsion according to claim 15, wherein the anti-foaming agent is selected from the group consisting of mixtures of silica and mineral oil, polysiloxanes, tributylphosphate, and metallic soaps.

17. A method for producing an aqueous emulsion of bitumen according to claim 1, comprising the steps consisting of:
preparing an aqueous phase;
adding to said aqueous phase at least one ethylene oxide and propylene oxide copolymer;
heating the aqueous phase to a temperature comprised between 40° C. and 70° C.;
incorporating the bitumen, previously heated between 140° C. and 180° C., into the aqueous phase under mechanical stirring.

18. A method for producing an aqueous emulsion of bitumen according to claim 15, comprising the steps consisting of:
preparing an aqueous phase;
adding to said aqueous phase at least one ethylene oxide and propylene oxide copolymer;
heating the aqueous phase to a temperature comprised between 40° C. and 70° C.;
incorporating the bitumen, previously heated between 140° C. and 180° C., into the aqueous phase under mechanical stirring.

19. A composition comprising at least one hydraulic or organic binder, and a bitumen emulsion according to claim 1.

20. The composition according to claim 19, wherein the hydraulic binder is constituted by at least one hydraulic binder selected from the group consisting in Portland cement or equivalent, a cinder-based cement, a high-alumina cement, and calcium sulphate.

21. The composition according to claim 19, wherein the organic binder is constituted by at least one polymer binder selected from the group consisting of butadiene styrenes, acrylic copolymers, and ethylene polyvinylacetates.

22. The composition according to claim 19, wherein the mineral filler is constituted by at least one generally inert filler of the type habitually used in formulations for the building and civil engineering industries, selected from the group consisting of sand, aggregates, silica, calcium carbonate, barium sulfate, talc, and mica.

23. The composition according to claim 19, wherein the organic filler is constituted by at least one organic filler selected from the group consisting of polymer fibers, cellulose fibers, and/or polystyrene balls.

24. A composition comprising at least one hydraulic or organic binder, and containing a bitumen emulsion according to claim 15.

25. A composition for bedding materials and sands for the bed of highways and roads, comprising a hydraulic binder of the Portland cement cinder or clinker or equivalent, containing from 0.5 to 6% by weight of a bitumen emulsion according to claim 1.

26. A composition for bedding materials and sands for the bed of highways and roads, comprising a hydraulic binder of the Portland cement cinder to clinker or equivalent, containing from 0.5 to 6% by weight of a bitumen emulsion according to claim 15.

27. A method for preparing a composition according to claim 26, wherein mixing is done in one single mixer on the site, or at a unit remote from the site.

28. A method for formulating a composition selected from the group consisting of mortars, mortar-adhesives, coatings for facings, finishing coatings, paints, concretes, keying primers, waterproofing primers, roadway seams, bedding material and sands for the beds of roads and highways, soil or slag base from burning household waste for use as ground fill, cold-application substitutes for hot-application products for surfacing roads and highways, and layers for shaping and bedding roadways and sealing mortars, comprising the use of an aqueous bitumen emulsion according to claim 1.

29. The method according to claim 28, wherein the composition comprises at least one hydraulic or organic binder, and/or at least one inorganic or organic filler.

30. The method according to claim 29, wherein the hydraulic binder is constituted by at least one hydraulic binder selected from the group consisting of a Portland cement or equivalent, a high-alumina cement, and a calcium sulphate.

31. The method according to claim 29, wherein the organic binder is constituted by at least one polymer binder, selected from the group consisting of butadiene styrenes, acrylic copolymers, and ethylene polyvinylacetates.

32. The method according to claim 29, wherein the inorganic filler is constituted by at least one generally inert filler of the type habitually used in formulations for the building and civil engineering industries, selected from the group consisting of sand, aggregates, silica, calcium carbonates, calcium silicates, barium sulfates, talc, and mica.

33. The method according to claim 29, wherein the organic filler is constituted by at least one organic filler selected from the group consisting of polymer fibers, cellulose fibers, and polystyrene balls.

34. A method for formulating a composition selected from the group consisting of mortars, mortar-adhesives, coatings for facings, finishing coatings, paints, concretes, keying primers, waterproofing primers, roadway seams, bedding material and sands for the beds of roads and highways, soil or slag base from burning household waste for use as ground fill, cold-application substitutes for hot-application products for surfacing roads and highways, and layers for shaping and bedding roadways and sealing mortars, comprising the use of an aqueous bitumen emulsion according to claim 15.

35. A constructional materials kit, comprising, firstly, the bitumen emulsion according to claim 1, and, secondly, at least one hydraulic or organic binder, and/or at least one inorganic or organic filler.

36. A constructional materials kit, comprising, firstly, the bitumen emulsion according to claim 15, and, secondly, at least one hydraulic or organic binder, and/or at least one inorganic or organic filler.

37. The emulsion according to claim 2, wherein the molecular weight of the ethylene oxide and propylene oxide copolymer is 2000.

38. A method for producing an aqueous emulsion of bitumen according to claim 1, comprising the steps consisting of:

preparing an aqueous phase using a thickener incorporated into water with stirring;

adding to said aqueous phase at least one ethylene oxide and propylene oxide copolymer;

heating the aqueous phase to a temperature comprised between 40° C. and 70° C.;

incorporating the bitumen, previously heated between 140° C. and 180° C., into the aqueous phase under mechanical stirring.

39. A method for producing an aqueous emulsion of bitumen according to claim 15, comprising the steps consisting of:

preparing an aqueous phase using a thickener incorporated into water with stirring;

adding to said aqueous phase at least one ethylene oxide and propylene oxide copolymer;

heating the aqueous phase to a temperature comprised between 40° C. and 70° C.;

incorporating the bitumen, previously heated between 140° C. and 180° C., into the aqueous phase under mechanical stirring.

40. A composition comprising at least one inorganic or organic filler, and containing a bitumen emulsion according to claim 1.

41. A composition according to claim 19 comprising at least one inorganic or organic filler.

42. A composition comprising at least one inorganic or organic filler, and containing a bitumen emulsion according to claim 15.

43. A composition according to claim 24 comprising at least one inorganic or organic filler.

* * * * *

UNITED STATES PATENT AND TRADEMARK OFFICE
CERTIFICATE OF CORRECTION

PATENT NO. : 6,451,885 B1
DATED : September 17, 2002
INVENTOR(S) : Dresin et al.

It is certified that error appears in the above-identified patent and that said Letters Patent is hereby corrected as shown below:

Title page,
Item [75], Inventors, please delete "Lyons" and insert -- Lyon --.

Column 7,
Line 44, after "LC 818 C", please insert -- (Ethylene oxide/propylene oxide copolymer, MW about 2000, 21 units EO and 23 units PO) --.
Table II, Example 1, #1, please delete "Viatotal" and insert -- VIATOTAL --.
Table II, Example 2, #1, please delete "Viatotal" and insert -- VIATOTAL --.
Table II, Example 1, #2, after "LC 818 C", please insert -- (Ethylene oxide/propylene oxide copolymer, MW about 2000, 21 units EO and 23 units PO) --.
Table II, Example 2, #2, after "LC 818 C", please insert -- (Ethylene oxide/propylene oxide copolymer, MW about 2000, 21 units EO and 23 units PO) --.
Table II, Example 1, #3, please delete "Kelcocrete KIC376" and insert
-- KELCOCRETE K1C376 (Welan gum)---
Table II, Example 2, #3, please delete "Esacol ED 10"and insert -- ESACOL ED 10 (Hydropropyl guar (polysaccharide)) --.
Table II, Example 2, #4, please delete "Rhodoline DF 6681" and insert -- RHODOLINE DF 6681 (mixture of fine silica and mineral oil) --.
Line 66, please delete "Viatotal" and insert -- VIATOTAL --.

Column 8,
Line 1, after "LC 818 C", please insert -- (Ethylene oxide/propylene oxide copolymer, MW about 2000, 21 units EO and 23 units PO) --.
Line 3, please delete "Kelcocrete" and insert -- KELCOCRETE --.
Line 4, please delete "3: (thickener): Esacol ED 10 (guar".
Lines 5-6 please delete, and line 5, please insert new paragraph -4: (thickener): ESACOL ED 10 (Hydropropyl guar (polysaccharide)) available from Lamberti. --.; line 6, please insert new paragraph -5: (anti-foaming agent): RHODOLINE DF 6681 (mixture of fine silica and mineral oil) available from Rhodia. --.
Line 58, please delete "Flexocim®" and insert -- FLEXOCI M® --.

UNITED STATES PATENT AND TRADEMARK OFFICE
CERTIFICATE OF CORRECTION

PATENT NO.    : 6,451,885 B1
DATED         : September 17, 2002
INVENTOR(S)   : Dresin et al.

It is certified that error appears in the above-identified patent and that said Letters Patent is hereby corrected as shown below:

Column 10,
Line 14, please delete "Rhodopas" and insert -- RHODOPAS --.
Line 15, please delete "Rhodopas" and insert -- RHODOPAS --.
Line 16, please delete "(Primal 2727, Rohm & Hass);" and insert -- (PRIMAL 2727, Rohm & Haas); --.
Line 17, please delete "Vinnapas" and insert -- VINNAPAS --.
Table III, Example A, #1, please delete "Viatotal" and insert -- VIATOTAL --.
Table III, Example B, #1, please delete "Viatotal" and insert -- VIATOTAL --.
Table III, Example A, #3, please delete "Esacol ED 10 0.1 %" and insert -- ESACOL ED 10 (Hydropropyl guar (polysaccharide)) 0.1 % --.
Line 37, please delete "Viatotal" and insert -- VIATOTAL --.
Line 39, please delete "Prox" and insert -- PROX --.
Line 40, please delete "Airvol" and insert -- AIRVOL --.
Line 42, please delete "Esacol ED 10" and insert -- ESACOL ED 10 (Hydropropyl guar (polysaccharide)) --.

Column 11,
Line 1, the chart under the heading "The following formulation was adopted:", please delete "Tylose" and insert -- TYLOSE --.
Line 2, the chart under the heading "The following formulation was adopted:", please delete "(Troysan 186." and insert -- (TROYSAN 186 (Aminopropanol), --.
Line 5, the chart underthe heading "The following formulation was adopted:", please delete "(Dispex A40," and insert -- (DISPEX A40 (Ammonium polyacrylate, dry content 40% wt.), --.
Line 6, the chart under the heading "The following formulation was adopted:", please delete "Nopco" and insert -- NOPCO --.
Line 7, the chart under the heading "The following formulation was adopted:", please delete "Tioxide" and insert -- TIOXIDE --.
Line 8, the chart under the heading "The following formulation was adopted:", please delete "Mikhart" and insert -- MIKHART --.
Line 9, the chart underthe heading "The following formulation was adopted:", please delete "Mikhart" and insert -- MIKHART --.
Line 15, the chart under the heading "The following formulation was adopted:", please delete "Rheo 3000," and insert -- RHEO 3000 (thickener acrylic associative copolymer dispersed in water, dry content 30% wt.), --.
lines 19-20, please delete "Rhodo-pass" and insert -- RHODOPASS --.
Line 3, the chart under the heading "The adopted formula was as follows:", please delete "Dispex A40." and insert -- DISPEX A40 (Ammonium polyacrylate, dry content 40% wt.),- --.

UNITED STATES PATENT AND TRADEMARK OFFICE
CERTIFICATE OF CORRECTION

PATENT NO. : 6,451,885 B1
DATED : September 17, 2002
INVENTOR(S) : Dresin et al.

It is certified that error appears in the above-identified patent and that said Letters Patent is hereby corrected as shown below:

Column 11 (cont'd),
Line 4, the chart under the heading "The adopted formula was as follows:", after "pigment", please insert -- (ACTIROX 213 (Zinc phosphate), from Colores Hispania)-,
Line 5, the chart under the heading "The adopted formula was as follows:", please delete
Line 6, the chart under the heading "The adopted formula was as follows:", please delete "Micarvor 20," and insert -- MICARVOR 20 (mica of the muscovite type (hydrated aluminum and magnesium silicate) with a granulometry below 20 µm), --.
Line 7, the chart under the heading "The adopted formula was as follows:", please delete "Bayferrox" and insert -- BAYFERROX --.
Line 8, the chart under the heading "The adopted formula was as follows:", please delete "Nopco" and insert -- NOPCO --.
Line 11, the chart under the heading "The adopted formula was as follows:", please delete "Rheo 2100," and insert -- RHEO 2100 (thickener acrylic associative copolymer dispersed in water, dry content 30% wt.), --.
Line 66, please delete "Acronal" and insert -- ACRONAL --.

Column 12,
Line 47, please delete "Nopco" and insert -- NOPCO --.

Column 13,
Line 1, the chart under the heading "Example 8", please delete "Tylose" and insert -- TYLOSE --.
Line 2, the chart under the heading "Example 8", please delete "(Troysan 186, from Troy company)" and insert -- (TROYSAN 186 (Aminopropanol), from Troy Co.) --.
Line 5, the chart under the heading "Example 8", please delete "(Dispex Ato, Allied Colloids) and insert -(DISPEX A40 (Ammonium polyacrylate, dry content 40% wt.), Allied Colloids) --.
Line 6, the chart under the heading "Example 8", please delete "Nopco" and insert -- NOPCO --.
Line 7, the chart under the heading "Example 8", please delete "Tioxide" and insert -- TIOXIDE --.
Line 9, the chart under the heading "Example 8", please delete "Mikhart" and insert -- MIKHART --.
Line 10, the chart under the heading "Example 8", please delete "Mikhart" and insert -- MIKHART --.
Line 16, the chart under the heading "Example 8", please delete "(Rheo 3000, Coatex)" and insert -- (RHEO 3000 (thickener acrylic associative copolymer dispersed in water, dry content 30% wt.), Coatex) --.
Line 24, please delete "Rhodopos" and insert -- RHODOPOS --.

UNITED STATES PATENT AND TRADEMARK OFFICE
CERTIFICATE OF CORRECTION

PATENT NO.    : 6,451,885 B1
DATED         : September 17, 2002
INVENTOR(S)   : Dresin et al.

It is certified that error appears in the above-identified patent and that said Letters Patent is hereby corrected as shown below:

Column 13 (cont'd),
Line 30, please delete "Nopco" and insert -- NOPCO --.
Example 9, Formula A, Line 4, please delete "Culminal" and insert -- CULMINAL --.
Example 9, Formula A, Line 8, please delete "Primal" and insert--PRIMAL --.
Example 9, Formula B, Line 4, please delete "Culminal" and insert -- CULMINAL --.
Example 9, Formula B, Line 6, please delete "Nopco" and insert- NOPCO --.
Lines 65-66, please delete "Viato-tal" and insert -- VIATOTAL --.

Column 14,
lines 1-2, please delete "(LC818C, Sidobre Sinnoval)" and insert -- (LC 818C (Ethylene oxide/propylene oxide copolymer, MW about 2000, 21 units EO and 23 units PO), Sidobre Sinnova) --.
Table V, Line 7, please delete "Acronal" and insert -- ACRONAL --.
Table V, Line 9, please delete "Rhodapass" and insert -- RHODAPASS --.
Table V, Line 13, please delete "Nopco" and insert -- NOPCO --.

Column 15,
Table V, Line 2, please delete "Culminal" and insert -- CULMINAL --.
Formula C, Line 4, please delete "Acronal" and insert -- ACRONAL --.
Formula C, Line 6, please delete "Culminal" and insert -- CULMINAL --.
Formula C, Line 7, please delete "Nopco" and insert -- NOPCO --.
Formula D, Line 4, please delete "Rhodapass" and insert -- RHODAPASS --.
Formula D, Line 7, please delete "Culminal" and insert -- CULMINAL --.
Formula D, Line 8, please delete "Nopco" and insert -- NOPCO --.
Formula E, Line 6, please delete "Culminal" and insert -- CULMINAL --.
Formula E, Line 7, please delete "Nopco" and insert -- NOPCO --.

Column 16,
Line 21, please delete "Nopco"and insert -- NOPCO --.
Line 56, please delete "Rolac" and insert -- ROLAC --.
Formula F, Line 1, please delete "Rolac" and insert -- ROLAC --.

UNITED STATES PATENT AND TRADEMARK OFFICE
CERTIFICATE OF CORRECTION

PATENT NO. : 6,451,885 B1
DATED : September 17, 2002
INVENTOR(S) : Dresin et al.

It is certified that error appears in the above-identified patent and that said Letters Patent is hereby corrected as shown below:

Column 17,
Formula G, Line 1, please delete "Rolac" and insert -- ROLAC --.
Formula H, Line 1, please delete "Rolac" and insert -- ROLAC --.
Line 20, please delete "Rolac" and insert -- ROLAC --.
lines 27-28, please delete "Via-total" and insert -- VIATOTAL --.
Line 30, after "(LC 818C" please insert -- (Ethylene oxide/propylene oxide copolymer, MW about 2000, 21 units EO and 23 units PO) --.
Line 32, please delete "Nopco" and insert -- NOPCO --.
Line 37, please delete "Nopco" and insert -- NOPCO --.

Column 20,
Line 25, please delete "to" and insert -- or --.
Line 29, please delete "26" and insert -- 25 --.

Signed and Sealed this

Twenty-fourth Day of August, 2004

JON W. DUDAS
*Director of the United States Patent and Trademark Office*